(12) United States Patent
Blank et al.

(10) Patent No.: US 7,465,513 B2
(45) Date of Patent: Dec. 16, 2008

(54) MATCHING OF THE LOCAL AREA-SPECIFIC GAS FLOWS IN PEM FUEL CELLS

(75) Inventors: Felix Blank, Constance (DE); Cosmas Heller, Friedrichshafen (DE)

(73) Assignee: Daimler AG, Stuttgart (DE)

( * ) Notice: Subject to any disclaimer, the term of this patent is extended or adjusted under 35 U.S.C. 154(b) by 540 days.

(21) Appl. No.: 10/852,658

(22) Filed: May 25, 2004

(65) Prior Publication Data

US 2005/0019647 A1    Jan. 27, 2005

(30) Foreign Application Priority Data

May 26, 2003    (DE)    ................................ 103 23 644

(51) Int. Cl.
   *H01M 8/00*    (2006.01)
(52) U.S. Cl. .......................................... 429/34; 429/36
(58) Field of Classification Search ................... 429/30, 429/34, 35, 36, 37, 38
   See application file for complete search history.

(56) References Cited

U.S. PATENT DOCUMENTS

| | | | |
|---|---|---|---|
| 6,756,149 B2 * | 6/2004 | Knights et al. ................ | 429/38 |
| 6,844,101 B2 * | 1/2005 | Lee et al. ...................... | 429/39 |
| 6,921,598 B2 * | 7/2005 | Yamamoto et al. ............ | 429/34 |

FOREIGN PATENT DOCUMENTS

| | | |
|---|---|---|
| DE | 197 43 067 C2 | 9/1997 |
| DE | 692 19 758 T3 | 11/1997 |
| DE | 100 01 606 A1 | 1/2000 |
| DE | 100 45 098 A1 | 9/2000 |
| DE | 100 54 444 A1 | 10/2000 |
| DE | 100 55 253 A1 | 11/2000 |

* cited by examiner

*Primary Examiner*—Patrick Ryan
*Assistant Examiner*—Monique Wills
(74) *Attorney, Agent, or Firm*—Crowell & Moring LLP

(57) ABSTRACT

A passage structure for PEM fuel cells is configured locally differently in order to adapt the flow of gas on the membrane electrode assembly (MEA). Starting from the cathode entry port, the active gas volumetric flow per unit area on the MEA is locally varied by changing the number and/or cross section of the gas-carrying passages, so that the flow decreases toward the cathode exit port. Suitable configuration of the passage structure according to the invention allows the steam partial pressure to be optimally matched to the local conditions. The mass conversion is improved in these regions as a result without the electrolyte's drying out. At locations in the flowfield with a low gas humidity, the measures according to the invention (increased number of passages or passage width) significantly reduce the flow velocity. As a result, the transfer of water from the MEA to the gas flow is reduced and drying of the MEA is diminished.

8 Claims, 2 Drawing Sheets

MATCHING OF THE LOCAL AREA-SPECIFIC GAS FLOWS IN PEM FUEL CELLS

BACKGROUND AND SUMMARY OF THE INVENTION

This application claims the priority of German patent document 103 23 644.9, filed 26 May 2003, the disclosure of which is expressly incorporated by reference herein.

The invention relates to fuel cells with polymer electrolyte membranes (PEM).

In unhumidified or partially humidified fuel cells of this type, drying of the membrane electrode assembly (MEA) increases in the reaction area at the cathode entry, and the effective power of the cell deteriorates or, in extreme cases, the cell is damaged. The reason for such drying is the relatively dry cathode gas flow, which is also too high per unit area of the active cell, in this region, so that the product water which is formed at the catalyst is insufficient to humidify the MEA in order to reliably prevent drying-out effects. This applies in particular to fuel cells with conventional gas distributor structures (flowfields), in which the width of the gas-carrying passages is constant from the cathode entry to the cathode exit.

To avoid drying-out effects, prior art techniques include the use of flowfields for unhumidified or partially humidified PEM fuel cells made from porous material in order to balance out the steam partial pressure along the cathode passage.

At the cathode entry, the steam partial pressure is low because the intake air stream is unsaturated. This stream is then gradually enriched with water along the cathode passage by the product water which is formed, so that the steam partial pressure rises. Finally, at the cathode exit the steam partial pressure has risen to such an extent that liquid water is often formed through condensation and is taken up by the porous plates. The stream of water is guided in the plate, through diffusion, to the dry cathode entry and used to humidify the incoming cathode air stream in this region of the membrane.

The drawbacks of this arrangement are the high cost of the bipolar plate material comprising a porous structure, the considerable thickness of the bipolar plate and the sensitivity of a system of this type to high cell temperatures (as are desired, for example, in order to reduce the size of the cooling system of the fuel cell).

One object of the present invention is to provide a suitably configured gas distributor structure, so as to match the gas flows within the active cell area of PEM fuel cells, achieving a substantially uniformly distributed humidification state across the membrane area.

This and other objects and advantages are achieved by the gas flow structure according to the invention, in which starting from the cathode entry port, the active gas volumetric flow per unit area on the MEA is locally varied by changing the number and/or the cross sectional area of the gas-carrying passages, so that the flow decreases toward the cathode exit port. Suitable configuration of the passage structure according to the invention allows the steam partial pressure to be optimally matched to the local conditions. The mass conversion is improved in these regions as a result without the electrolyte's drying out. At locations in the flowfield with a low gas humidity, the measures according to the invention (increased number of passages or passage width) significantly reduce the flow velocity. As a result, the transfer of water from the MEA to the gas flow is reduced and drying of the MEA is diminished.

Other objects, advantages and novel features of the present invention will become apparent from the following detailed description of the invention when considered in conjunction with the accompanying drawings.

DETAILED DESCRIPTION OF THE DRAWINGS

As noted, the present invention solves the problem of the MEA drying out by means of specially configured passage structures, in which the passage volume (per unit passage length) through which the reaction gases flow is locally altered along the path from the gas entry port to the exit port. This means that in the critical regions of the MEA, the effective gas volume is adapted so that drying-out effects are substantially avoided. In particular, the total passage cross section through which the reaction gas flows is increased where there is a risk, in the flowfield, of drying out as a result of a relatively low humidity of the flowing gases (e.g. at the cathode entry). To increase the active passage volume, it is possible to increase the number of passages through which the reaction gas flows in parallel or the passage cross section, or both together. A further possible way of influencing the passage volume through which the reaction gas flows is to vary the passage width and/or the web width.

Figure 1:
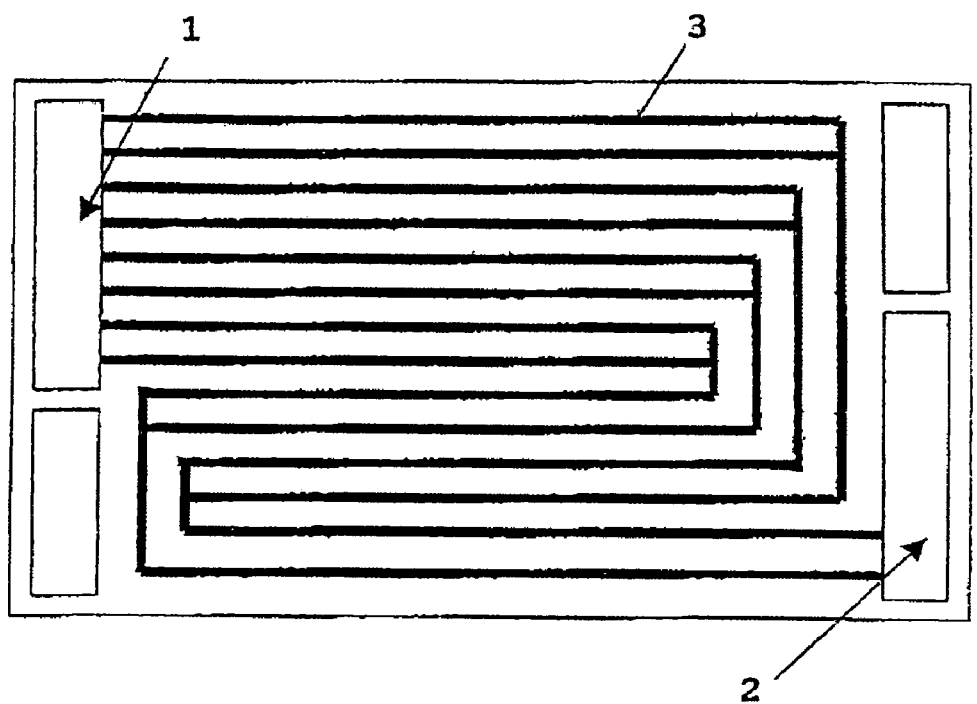
FIG. 1 shows a first embodiment of a passage structure according to the invention with a locally differing number of passages.

FIG. 1 depicts diagrammatically a first advantageous embodiment for increasing the active passage volume in a flowfield region in which the gas humidity is particularly low (e.g. in the cathode inlet region of an isothermal, unhumidified fuel cell with a cell temperature of over 60° C.). A plurality of passages (3) with an identical cross section carry the gas flow from the gas entry port (1) to the exit port (2). In this case, the number of passages running in parallel is reduced in sections. In the simplified illustration presented in FIG. 1, eight passages (3) leading from the entry port (1) are reduced initially to four, after a first section, and then to two remaining passages after a further section. The sum of the passage cross section through which the gas flows in parallel is reduced accordingly in steps in the respective regions from the gas entry port (1) to the exit port (2). The position, shape and extent of the different sections can be modified according to the particular configuration, as can the number of passages per section, so that, for example, instead of the number of passages being halved each section, as illustrated, it is possible to reduce the number of passages to a greater or lesser extent.

Figure 2:
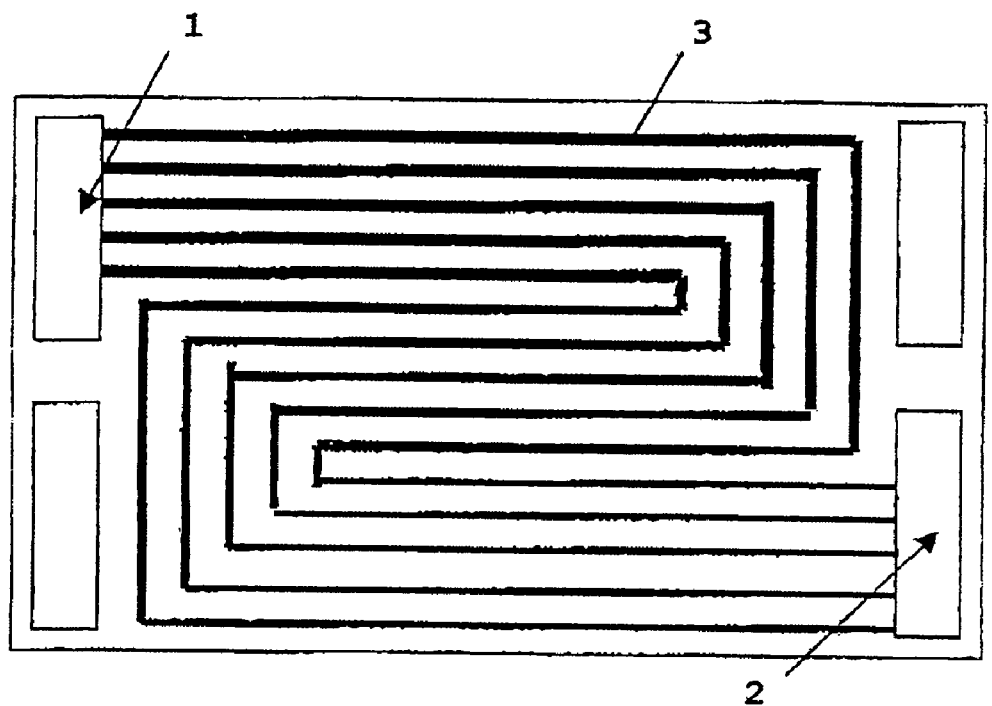
FIG. 2 shows a second embodiment with locally differing passage cross sections.

FIG. 2 illustrates an alternative embodiment, in which the number of passages (3) remains unchanged but the passage widths decrease from the entry port to the exit port. The figure illustrates a reduction in the passage widths in sections, although it is also possible for the passage cross sections to be reduced continuously (e.g., linearly) from the entry port to the exit port.

The two embodiments illustrated in FIGS. 1 and 2 can also be combined, resulting in a wide range of possible variations, allowing matching to fuel cells of different types and the corresponding operating parameters.

If one of the measures according to the invention is employed in a flowfield region in which the gases have a humidity which is too low, the gas volumetric flow per unit wetted MEA area of the active cell area is reduced i.e., more product water is formed by the electrochemical reaction per unit gas volumetric flow, so that drying of the MEA is reduced or eliminated in this region.

An additional advantageous influence results from the wetted MEA area being small at locations of low gas humidity, so that the transfer of water from the MEA to the gas flow is reduced. Conversely, the transfer of water out of the MEA to the gas flow at locations of high MEA humidity is improved by an enlarged wetted MEA area.

Figure 3:
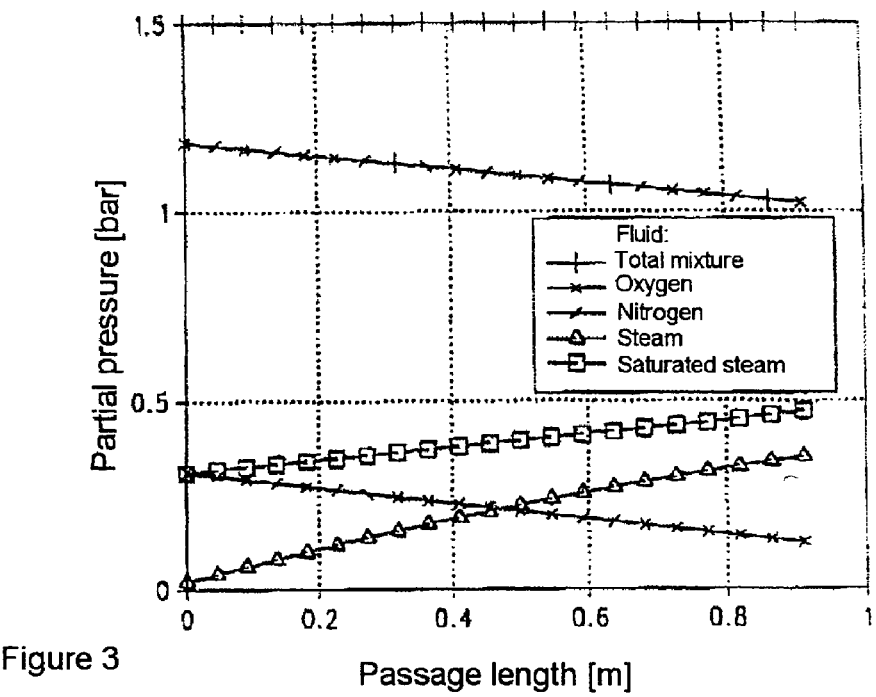
FIG. 3 illustrates the calculated partial pressure curves in a conventional flowfield.
Figure 4:
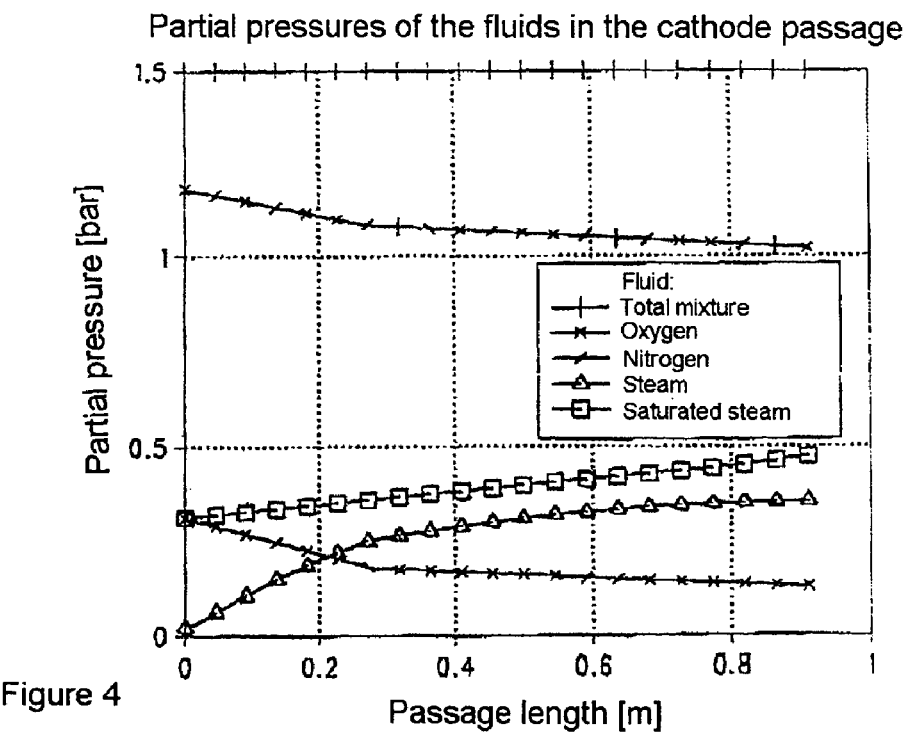
FIG. 4 illustrates the calculated partial pressure curves in a flowfield with a passage structure configured in accordance with the invention.

To illustrate the influence of a passage structure as shown in FIG. 1 compared to a conventional passage structure with a constant passage volume, FIGS. 3 and 4 illustrate the results of corresponding comparative calculations. FIG. 3 shows the mean partial pressure curve of the individual gas components on the cathode side along the flowfield with a conventional serpentine-like flowfield structure without any local passage branchings or passage widenings in accordance with the invention. FIG. 4 shows the mean partial pressure curves for a flowfield according to the invention with a passage structure corresponding to that shown in FIG. 1.

Both calculations were carried out with the same active cell area, the same gas flows at the cathode entry, the same temperature and absolute pressure profiles along the cathode passage and the same (homogeneous) reaction rate. The considerable difference between the local saturation partial pressure (-□-) of the cathode-side gas mixture and the local steam partial pressure (-Δ-) in the case of conventional serpentine flowfields is clearly apparent (FIG. 3). In FIG. 4, this difference is significantly reduced, and in the region close to the centre of the passage is even just a fraction of the value indicated in FIG. 3.

Since the difference between the local saturation partial pressure of the cathode-side gas mixture and the local steam partial pressure represents a direct measure of the drying-out of the MEA through diffusion water flows to the gas mixture, the result is a risk of the electrolyte drying out which is reduced—in some cases by a multiple—by the flowfield according to the invention. Suitable configuration of the passage structure according to the invention therefore allows the steam partial pressure to be optimally matched to the local conditions in particular in the region of the centre of the passage.

The matching of the local number of passages and/or passage cross-sectional area in accordance with the invention also promotes mass transfer of the water at the locations in the flowfield at which the flow velocity is high. This is the case in particular where the gas flow, according to the invention, is flowing through a small number of or narrower passages and the humidity of the gases is high. As a result, the transfer of water between MEA and gas flow is boosted in particular where there is sufficient humidity in the gas flow. The mass conversion in this region is improved as a result without the electrolyte drying out. At locations in the flowfield where the gas humidity is low, the measures according to the invention (increased number of passages or passage width) mean that the flow velocity is significantly lower. As a result, the transfer of water from the MEA to the gas flow is reduced, and the MEA dries out to a lesser extent.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel cell having a membrane electrode assembly with a flowfield situated within an active cell area, through which flowfield reaction gases flow in communication with the active cell area; wherein:
   said reaction gases are passed through passages within said flowfield, from an entry port of said flowfield to an exit port of said flowfield; and
   passage volume of said passages through which the reaction gases flow in communication with said active cell area is decreased in a direction of flow, by reducing successively within the active cell area the number of passages through which the reaction gases flow in parallel, in sections.

2. The fuel cell according to claim 1, wherein the passage volume is further decreased by reducing cross-sectional area of each of said passages.

3. The fuel cell according to claim 2, wherein the reduction in the passage cross-sectional area takes place in steps, from the entry port to the exit port.

4. The fuel cell according to claim 2, wherein the reduction in passage cross-sectional area takes place continuously, from the entry port to the exit port.

5. The fuel cell according to claim 1, wherein the passage volume through which the reaction gas flows per passage unit length is increased on a cathode side at locations of an active cell area at which relative humidity of the flowing gases is lower than in remaining regions of the active cell area.

6. The fuel cell according to claim 1, wherein the passage volume through which reaction gas flows per unit passage length is increased on an anode side at locations of an active cell area at which relative humidity of the flowing gases is lower than in remaining regions of the active cell area.

7. A fuel cell having membrane electrode assembly and comprising:
   an entry port;
   an exit port;
   a plurality of gas flow passages connecting said entry port to said exit port; wherein,
   a total cross sectional area of said gas flow passages decreases in a direction of gas flow from said entry port to said exit port;
   each of said gas flow passages has a uniform cross sectional area along its entire length; and
   a number of gas flow passages comprising said plurality decreases in said direction of gas flow.

8. A fuel cell having a membrane electrode assembly comprising:
   a flowfield in which reaction gases flow within an active cell area of the fuel cell;
   passages within said flowfield for accommodating said flow of reaction gases, from an entry port to an exit port;
   wherein an aggregate passage volume of said passages within said flowfield is decreased in a direction of flow, by successive reduction of the number of said passages within the active cell area through which the reaction gases flow.

* * * * *